United States Patent [19]

Holcombe et al.

[11] Patent Number: 4,880,578

[45] Date of Patent: Nov. 14, 1989

[54] METHOD FOR HEAT TREATING AND SINTERING METAL OXIDES WITH MICROWAVE RADIATION

[75] Inventors: Cressie E. Holcombe, Farragut; Norman L. Dykes, Oak Ridge; Thomas T. Meek, Knoxville, all of Tenn.

[73] Assignee: The United States of America as represented by the United States Department of Energy, Washington, D.C.

[21] Appl. No.: 229,892

[22] Filed: Aug. 8, 1988

[51] Int. Cl.$^4$ .............................................. C04B 35/64
[52] U.S. Cl. ......................................... 264/26; 264/25
[58] Field of Search .................................. 264/25, 26

[56] References Cited

U.S. PATENT DOCUMENTS 3,585,258  6/1971  Levinson .............................. 264/26
4,219,361  8/1980  Sutton .................................... 264/25

FOREIGN PATENT DOCUMENTS 57-187035  11/1982  Japan ..................................... 264/25

Primary Examiner—James Derrington
Attorney, Agent, or Firm—Earl L. Larcher; Stephen D. Hamel; Judson R. Hightower

[57] ABSTRACT

A method for microwave sintering materials, primarily metal oxides, is described. Metal oxides do not normally absorb microwave radiation at temperatures ranging from about room temperature to several hundred degrees centrigrade are sintered with microwave radiation without the use of the heretofore required sintering aids. This sintering is achieved by enclosing a compact of the oxide material in a housing or capsule formed of a oxide which has microwave coupling properties at room temprature up to at least the microwave coupling temperature of the oxide material forming the compact. The heating of the housing effects the initial heating of the oxide material forming the compact by heat transference and then functions as a thermal insulator for the encased oxide material after the oxide material reaches a sufficient temperature to adequately absorb or couple with microwave radiation for heating thereof to sintering temperature.

10 Claims, 2 Drawing Sheets

METHOD FOR HEAT TREATING AND SINTERING METAL OXIDES WITH MICROWAVE RADIATION

This invention was made as a result of work under contract DE-ACO5-840R21400 between Martin Marietta Energy Systems Inc., and the U.S. Department of Energy.

BACKGROUND OF THE INVENTION

The present invention relates generally to a method for heat treating and sintering oxide materials with microwave radiation, and more particularly to the sintering of such materials which do not function effectively as microwave coupling materials at relatively low temperatures. The oxide material is enclosed in a housing which is formed of a material characterized by microwave coupling capabilities at lower temperatures for pumping the encased oxide material to a sufficient temperature to enable the oxide material to couple with the microwave radiation and then provide thermal insulation for retaining the heat in the oxide material.

Microwave radiation is becoming of increasing importance as a very efficient and effective tool for the heat treatment and sintering of materials such as refractory metal oxides. Microwave radiation very efficiently and rapidly heats the oxide materials to the relatively high temperatures required for sintering. Also, the microwave radiation penetrates the particulate mass of oxide material to providing a more uniform sintering of the oxide material than heretofore realized with the relatively non-uniform heat up provided by the conventional furnaces. However, in spite of many advantages it has been found that there are some problems attendant with the use of microwave radiation for the sintering of many oxide materials due to their being essentially transparent or non-coupling with microwave radiation even at relatively high frequencies of up to about 2.45 GHz at temperatures in a range of about room temperature up to about 900° C.

In order to effect the sintering of such oxide materials with microwave radiation, materials capable of absorbing or coupling with microwave radiation such as boron carbide, silicon boride, titanium nitride, or uranium oxide were previously admixed with the particulate oxide material for permitting the sintering of the oxide material with microwave radiation. In these instances the coupling materials function to heat the surrounding particulates of oxide material with microwave radiation with the heat being transferred from the coupling material to the surrounding oxide particulates. This heating continues until the oxide material reaches a temperature of several hundred degrees centrigrade where high frequency relaxation mechanisms such as ionic conduction and molecular vibrations occur in the oxide material. These relaxation mechanisms cause the oxide material to couple or absorb microwave radiation so that the oxide material can be heated thereby to the desired sintering temperature.

While the addition of coupling material to the body of oxide particulates forming a compact to be sintered has proven to be useful for the microwave heating of oxide materials from room temperature up to the temperature where the oxide materials couple with the microwave radiation, the purity of the sintered oxide material may be compromised by the presence of the added coupling material. Further, the properties and characteristics of the sintered oxide material with this added impurity are often altered sometimes deleteriously.

SUMMARY OF THE INVENTION

The primary aim or objective of the subject invention is to provide for the microwave-radiation sintering of oxide materials heretofore found to be of the noncoupling or nonmicrowave absorbing type at temperatures in the range of about room temperature to about 900° C. The method of the invention provides for the sintering of oxide materials which experience insufficient coupling with microwave radiation at lower temperatures to utilize the microwave sintering techniques without employing a microwave coupling agent in the particulate oxide compact. Generally, this method for heat treating or sintering oxide materials with microwave radiation comprises the steps of enclosing a compact of oxide particulates in housing means formed of a metal oxide characterized by coupling with microwave radiation at temperatures ranging from room temperature to a temperature greater than that which the oxide particulates forming a compact initiate coupling with the microwave radiation. The encasing or enclosing of the compact within the housing permits the heating of the housing with the microwave radiation with a substantial portion of this heat being transferred from the housing to the enclosed oxide compact for heating the latter. The housing also provides a thermal insulator about the oxide compact at temperatures above which the oxide material forming a compact couples with microwave radiation so as to retain within the housing means and compact the heat given off from the compact during the heating thereof with microwave radiation. The housing means and the enclosed compact are subjected to a microwave radiation for sufficient duration to heat the compact to a selected temperature for effecting the desired heat treatment or sintering thereof.

Other and further objects of the present invention will be obvious upon an understanding of the illustrative method about to be described or will be indicated in the appended claims, and various advantageous not referred to herein will occur to one skilled in the art upon employment of the invention in practice.

The graph and the embodiments of the invention shown were chosen for the purpose of illustration and description of the method of the present invention and are not intended to be exhausted or to limit the invention to the precise forms disclosed. The graph and the embodiments illustrated are chosen and described in order to best explain the principles of the invention and their application to thereby enable others skilled in the art to best utilize the invention in various embodiments and modifications as are best adapted to the particular use contemplated.

DETAILED DESCRIPTION OF THE INVENTION

With reference to the accompanying drawings, the method of sintering oxide particulates forming a compact of oxide material characterized by lacking significant microwave coupling properties for substantial heating thereof at temperatures less than about 900° C., is achieved by enclosing the compact of the oxide material in a housing formed a material capable of coupling with microwave radiation at temperatures much lower than the oxide material forming the compact. This housing is heated by the microwave radiation with this heat being transferred therefrom to the enclosed oxide compact to raise or pump the temperature of the latter to a temperature where sufficient high frequency relaxation mechanisms are provided to functionally couple the oxide material forming the compact with the microwave radiation for further heating of the compact. With the oxide material forming the compact coupling with the microwave radiation, the housing enclosing the compact functions as a thermal insulator for minimizing or inhibiting heat loss from the oxide compact during heat up to sintering temperatures so as to significantly facilitate the sintering operation since heat loss by radiation from the compact without such thermal insulation would considerably lengthen the time required for sintering.

The oxide material to be sintered in accordance with the method of the present invention as noted above does not possess sufficient coupling capabilities with microwave radiation to be adequately heated thereby for sintering purposes at lower temperatures in a range of about room temperature to about 900° C. with this latter temperature varying in accordance with the particular oxide material selected. Metal oxides which possess this characteristic include yttria, alumina, silica, beryllium oxide, magnesia, and calcia in pure phases as well as such oxides with minor additions used for phase stabilization or for providing certain desired physical properties. Also, mixed oxides of these materials such as alumina-silica or magnesia-alumina are readily processed by the method of the present invention.

Figure 1:
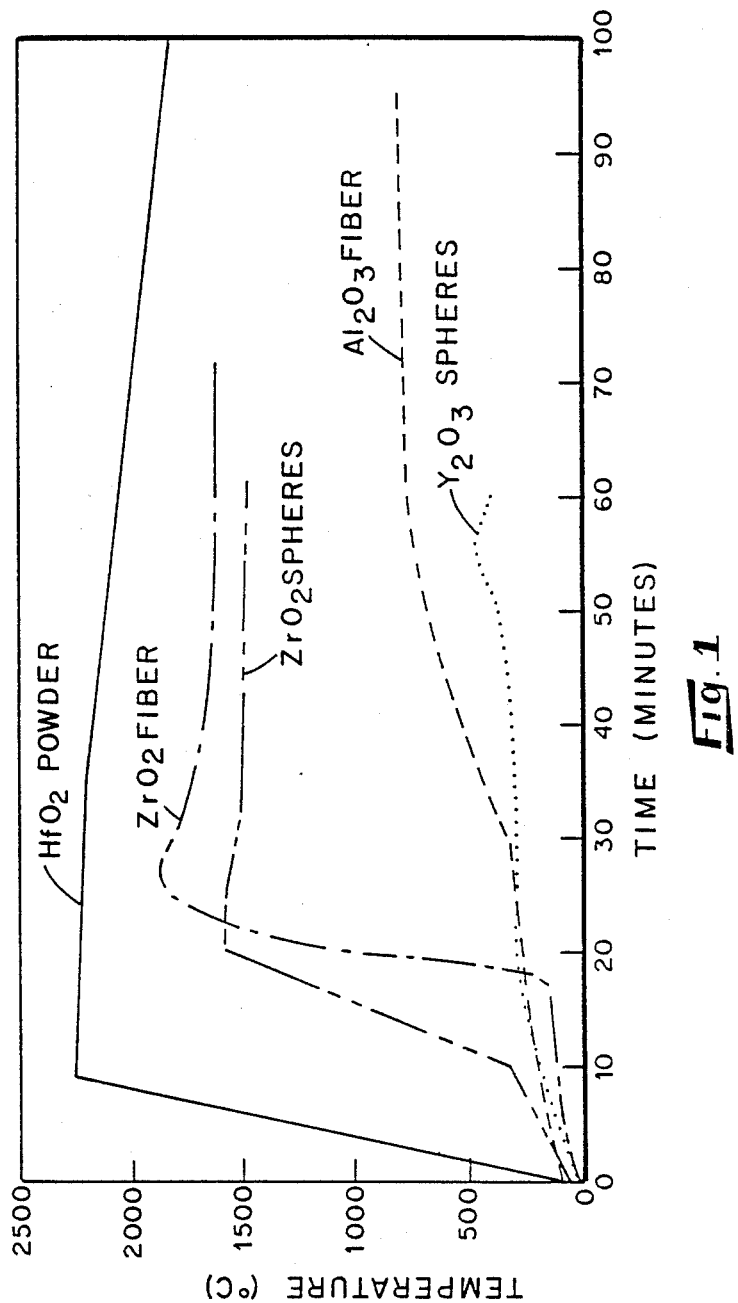
FIG. 1 is a graph illustrating the microwave radiation coupling capabilities of zirconia and hafnia at room temperature up to over 1500° C. and also the substantial absence of microwave radiation coupling capabilities at lower temperatures for refractory metal oxides such as yttria and alumina which demonstrate the ineffectiveness of microwave heating of these refractory metal oxides from room temperatures without a coupling additive or the utilization of the present invention.

As generally shown in FIG. 1, the oxides yttria and alumina, when subjected to microwave radiation at a high frequency level of 2.45 GHz undergo relatively slow heat up without the oxide reaching a sufficient temperature to provide the necessary high frequency relaxation mechanisms for introducing microwave radiation absorbing capabilities within the oxide adequate for heating the oxides to sintering temperatures.

The oxide materials to be sintered are provided by forming a compact of the oxide particulates with the compact being cold pressed to a density in the range of about 40 to 60% of theoretical density. The size range of the oxide particulates forming the compact is typically in a size range of about 2 to 75 microns. These particulates of oxide material forming the compact are sinterable in essential pure phases in a microwave radiation environment without utilizing sintering aides.

Figure 2:
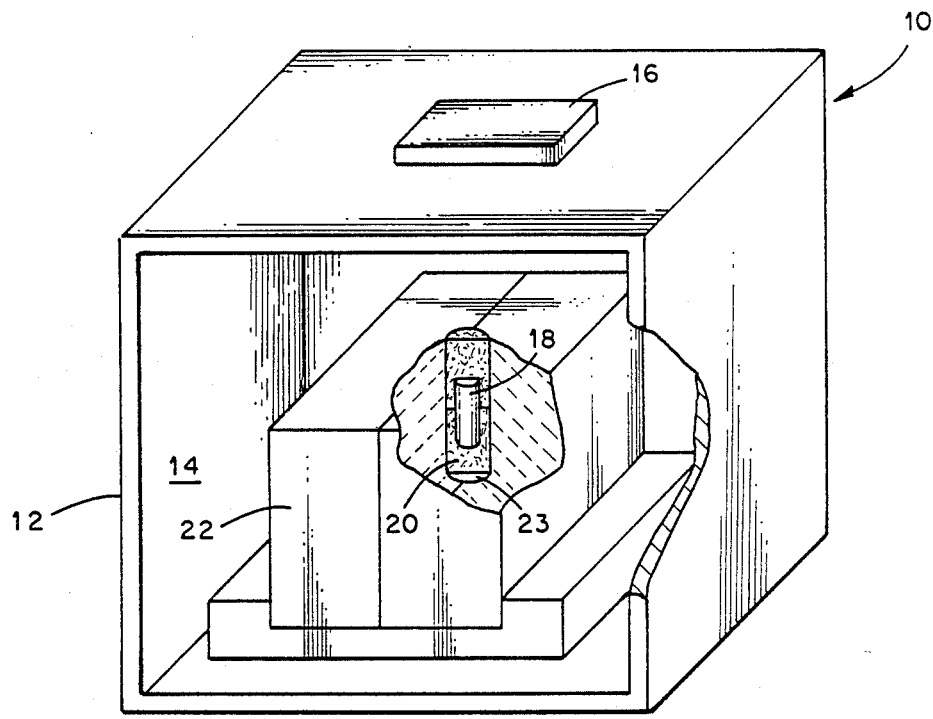
FIG. 2 is a schematic illustration showing a conventional microwave oven containing the housing of the present invention with a compact of oxide material encased therein for sintering purposes.
Figure 3:
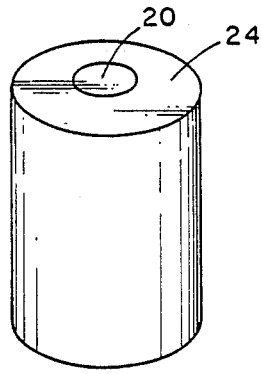
FIG. 3 shows another form of the housing of the present invention in which a compact of oxide material maybe sintered therein.

As shown in FIGS. 2 and 3, a typical microwave oven is generally shown at 10 and comprises a housing or shell 12 with a volume or chamber 14 therein for receiving materials to be heated with microwave radiation. The microwave radiation directed into the chamber 14 is provided by employing a suitable magnetron and wave guide arrangement as generally shown at 16 at a convenient location on the oven. An additional magnetron (not shown) may be disposed on the opposite side of the chamber to help flood the chamber with microwave radiation at the desired frequency. The magnetrons when activated essentially fill the chamber 14 with microwave radiation at various power levels so that articles disposed within the chamber 14 may be heat treated by coupling with the microwave radiation. Normally, microwave radiation in conventional oven is in a frequency range of 2.45 GHz at power levels of about 0.06 to 6 kw.

In accordance with the present invention the compacts of the oxide materials, such as generally shown at 18, to be sintered by practicing the present invention are encased in a housing 20 of a relatively low density metal oxide. This housing 20 constructed of a metal oxide material such as zirconia, hafnia, or a combination thereof (either unstabilized or stabilized with low levels of calcia, magnesia or yttria) which is capable of withstanding temperatures at least as high as that required for sintering the oxide compact encased therein. This housing material is also necessarily characterized by being capable of coupling with microwave radiation at a temperature in a range from room temperature to above the temperature at which the oxide material forming the compact couples with the microwave radiation due to the introduction of high frequency relaxation mechanisms therein. The housing 20 is prepared from the aforementioned metal oxide to provide a low density structure in the form of fibers, powders, hollow spheroids or granules which can provide both a sufficient mass to be heated by microwave radiation to adequately and rapidly heat the encased compact 18 to the desired temperature and sufficient temperature insulating properties at the higher temperatures to retain in the housing a significant percentage of the heat being emitted from the encased compact during the microwave heating thereof for sintering the oxide particulates forming the compact. FIG. 1 illustrates the low temperature microwave coupling capabilities of hafnia powder, zirconia fibers, and zirconia spheroids.

In addition to the housing 20 providing thermal insulation for the encased compact further thermal insulation may also be provided by enclosing the housing 20 in a suitable thermal insulating structure such alumina insulating blocks or bricks 22 disposed about the housing 20 as shown in FIG. 2 with the housing 20 being placed in a suitable cavity 23 within the insulating bricks 22.

The oxide materials forming the housing 20 may include additional materials such as used for stabilization of the oxide. For example, zirconia fibers and spheroids may be partially stabilized with up to about 15 wt. % of yttria, magnesia, calcia or any of various well known zirconia stabilizing agents so as to assure the integrity of the fibers forming the housing during the microwave sintering operation.

In an alternative embodiment as shown in FIG. 3, the bricks 22 utilized for supporting and insulating the housing 20 may be replaced with a thermal insulating casket 24 formed of a suitable refractory material which is noncoupling with the microwave radiation at lower temperatures such as provided by an alumina-10 wt. % silica composition. This casket 24, like the bricks 22, provides additional thermal insulation for the housing 20 and the encased compact 18 during high temperatures for facilitating the sintering operation.

The preferred material utilized for forming the housing 20 of the present invention is zirconia fibers with a pack density of about 10 to 30 percent of theoretical. The housing 20 formed of zirconia fibers containing 8 wt. % yttria as a stabilizing agent and packed at a density of 10.7% of theoretical can couple with microwave radiation to provide a plateau temperature of 1860° C. in a period of about 26 minutes in a microwave oven with a 1.6 kw energy input and 2.45 GHz frequency. A housing formed of hollow zirconia and spheroids stabilized with 4 wt. % calcia and packed to about 28.5% of theoretical density has a lower plateau temperature of about 1567° C. and can reach this temperature in about 20 minutes at similar microwave energy levels. On the other hand, hafnia powder loosely packed to form a housing at approximately 22.7 wt. % of theoretical density provides a significantly higher plateau temperature of 2250° C. and can reach this plateau temperature in the microwave energy field of 2.45 GHz in about 9 minutes. These plateau temperatures provided by these materials would be achieved at slower heating rates with an encased compact due to heat transference from the housing to the compact. FIG. 1 illustrates the heating of these housing materials with a 1.6 kw energy input and a 2.45 GHz power level. The use of additional power may raise the maximum temperature of the housing and encased compact 100° C. or more and may be beneficial for sintering a larger part, but it is believed that the use of higher power levels will not change the basic microwave coupling characteristics of the housing materials to any significant extent.

The hafnia powder provides a desirable housing material due to its melting point being approximately 2800° C. A housing formed of −325 mesh hafnia powder will provide for the pumping of an encased article to about 2000° C. The thickness of the hafnia powder housing surrounding the compact to be sintered as well as the density of this powder is important in the practice of the invention in that loosely packed powder at a density in the range of 20 to 40% of theoretical density provides the desirable plateau temperatures. However, a drawback is present in that pure hafnia will pump the enclosed compact to higher temperatures than hafnia which has been previously used as housing material. The reused hafnia appears to have the grain size altered from the initial starting size even though sintering of the particulate mass does not occur. Zirconia powder has a melting temperature of approximately 2700° C. so that some sintering of the powders may occur at higher temperatures. On the other hand, zirconia in the form hollow spheres or spheroids or fibers encountered little or no sintering during the pumping of the encased compact.

In order to provide a more facile understanding of the present invention, examples are set forth below showing and comparing the sintering of selected oxide materials with and without the use of the present invention.

EXAMPLE 1

The disk formed of 98 wt. % yttria powder mixed with 2 wt. % zirconia which was derived from dissociating zirconium oxynitrate (which dissociates at ≦500° C. to yield $ZrO_2$) and at a density at ∼50% of theoretical density was loaded into a cavity of a housing formed of zirconia fibers at a packed density of 10.7%. The housing with the compact completely enclosed in a cavity therein was then placed in a receptacle of formed of bricks of alumina and subjected to microwave radiation emanating from magnetrons on opposite sides of a microwave oven with each magnetron providing 0.8 kw of power at a frequency of 2.45 GHz. The compact was exposed to the microwave radiation for 30 minutes and then removed from the housing and visually examined. Tests and analyses of the compact indicated that the disks had a sintered structure with a closed porosity of 0.4%, an open porosity of 11%, an average pore diameter of 0.9 micrometers, and a real density of 4.49 grams per cubic centimeter which is 89% of theoretical density for the material. Further, the compact exhibited a smooth and hard surface.

EXAMPLE 2

As a comparison, a compact similar to the one sintered in the housing of Example 1 was subjected to a similar microwave power and energy level for a like duration but without being enclosed in a fibrous zirconia housing of Example 1. Examination of this disk after being subjected to the microwaves indicated that no significant sintering and densification of the material occurred so as to demonstrate that the oxide material without the zirconia housing lacked the capability of sufficiently coupling with the microwave radiation to effect the desired or necessary heating thereof for sintering purposes.

EXAMPLE 3

A compact of ∼2 g/cm³ density formed of 98 wt. % alumina powder with an additional 2 wt. % of alumina derived from dissociating aluminum nitrate (which dissociates at ≦500° C. to yield $Al_2O_3$) was processed in a manner similar to that described in Example 1. The compact subjected to the microwave radiation while encased within the zirconia fiber housing of the present invention had a sintered structure with a density of 3.63 grams per cubic centimeter which is 90% of the theoretical density for the oxide material. The sintered compact also had an open porosity of 1% and a closed porosity of 8.8% with an average pore diameter of 0.8 micrometers as well as a hard and smooth surface.

EXAMPLE 4

A compact of alumina similar to Example 3 but without being enclosed in the housing was subjected to the same microwave radiation treatment. An examination of this compact showed that the particulates forming the compact experienced no sintering or densification.

EXAMPLE 5

A compact formed of 98 wt. % yttria powder with an additional 2 wt. % yttria derived from dissociating yttrium nitrate (which dissociates at ≦500° C. to yield $Y_2O_3$) was subjected to microwave radiation in the manner described in Example 1. The compact enclosed within the zirconia fiber housing of the present invention provided a sintered structure at a density of 4.75 grams per cubic centimeter which corresponds to 86% of the theoretical density. The sintered compact also possessed an open porosity of 8.6%, a closed porosity of 5.6%, an average of pore diameter of 0.9 micrometer and a smooth hard surface.

EXAMPLE 6

A compact of the oxide material of Example 5 was subjected to the same radiation level and duration but not enclosed in the fibrous zirconia housing of the present invention. Examination of this compact indicated that no densification or sintering had occurred.

EXAMPLE 7

In this Example, 10 wt. % of zirconium oxynitrate solution (which contains 20 wt. % dissolved zirconia in the form of nitrate) was added to the yttria powder used for forming a compact as in Example 1. If the nitrate were dissociated by heating, the compact would contain 2 wt. % of zirconia. However, the nitrate was not dissociated in order to incorporate in the compact a microwave coupling agent (namely zirconium nitrate) as known in the art. The purpose of adding this coupling agent was for determining the significance of the housing of fibrous zirconia in combination with a conventional microwave coupling agent. It was found that the use of this quantity of additive was insufficient to provide microwave sintering by itself, but together with the surrounding zirconia housing it was found that the coupling agent did promote some sintering of the yttria powder. However, this additive has drawbacks which detract from its usefulness. For example, the products of decomposition (namely nitrogen oxides) formed during heat up caused cracks and fractures to occur in the compact.

It will be seen that the present invention provides a significant improvement for the sintering of certain oxide materials with microwave radiation in a highly efficient manner without detracting from the purity of the oxide material by using sintering aids as heretofore required for the microwave sintering of such oxide materials. Although specifically tested for sintering microwave transparent oxides, this method of using a pumping material is also useful for accelerating the microwave processing of absorbing materials. For instance, $UO_x$, $AlB_{12}$, W-3.5 wt. % Ni-1.5 wt. % Fe, and Nb metal compacts can be heated without a pumping material. But, by using such pumping in solution as shown in this invention, the temperatures of >900° C. (which allow rapid microwave absorption) can be achieved quickly—in some cases in 1/5 of the time required without using the pumping material. Thus, for many materials other than oxides, the pumping material described by this invention is quite useful for microwave processing.

We claim:

1. A method for sintering together particulates of oxide material with microwave radiation comprising the steps of enclosing a compact of the particulates in housing means formed of zirconia, hafnia or a combination thereof and characterized by coupling with microwave radiation at temperatures lower than the microwave radiation coupling temperature of the particulates forming the compact, subjecting the housing means to microwave radiation for heating the housing means and the compact enclosed therein by heat transference from the housing means to raise the compact to a temperature at least adequate to initiate coupling of the particulate material forming the compact with microwave radiation and for providing thermal insulation about the compact for retaining within the housing means heat given off by the compact during the coupling thereof with microwave radiation, and subjecting the housing means and the compact enclosed therein to the microwave radiation for a sufficient duration to heat said compact to a temperature adequate for the sintering the particulates forming the compact.

2. The method of claim 1 when the particulates of oxide material are metal oxides.

3. A method for sintering together particulates of oxide material as claimed in claim 1, wherein said particulates of oxide material forming the compact comprise yttria, alumina, beryllium oxide, magnesia, silica, or calcia.

4. A method for sintering together metal oxide particulates as claimed in claim 2, wherein said housing means is provided with an encloseable cavity for receiving said compact.

5. A method for sintering together metal oxide particulates as claimed in claim 2, wherein said housing means is formed of zirconia, fibers or hollow spheroids of zirconia.

6. A method for sintering together metal oxide particulates, as claimed in claim 5, wherein the zirconia fibers are compacted to a density in the range of about 10 to 30% of theoretical density.

7. A method for sintering together metal oxide particulate as claimed in claim 2, wherein said housing means is formed of hafnia powder compacted to a density in the range of 20 to 40% of theoretical density.

8. A method for sintering together metal oxide particulates as claimed in claim 2, wherein the metal oxide forming the compact is characterized by initiating coupling with microwave radiation when elevated to a temperature within said housing means adequate to induce a sufficient level of high frequency relaxation mechanisms including ionic conduction and molecular vibrations therein to absorb sufficient microwave radiation to effect heating of the compact thereby.

9. A method for sintering together metal oxide particulates as claimed in claim 2, including the additional step of enclosing the housing means in thermal insulation means to reduce heat loss from said housing means during the heating thereof by microwave radiation.

10. A method for sintering together metal oxide particulates as claimed in claim 2, wherein the frequency of said microwave radiation is 2.45 GHz at a power level in the range of 0.6 to 6 kw, and wherein said sufficient duration is in the range of about 20 to 120 minutes.

* * * * *